United States Patent [19]
Landis et al.

[11] Patent Number: 5,216,918
[45] Date of Patent: Jun. 8, 1993

[54] FLUID MASS FLOW DETECTING

[75] Inventors: Donald G. Landis, Hollis; David E. Linzy, Merrimack, both of N.H.; John H. Fabricius, Ridgeland, S.C.

[73] Assignee: Integrated Control Concepts, Inc., Amherst, N.H.

[21] Appl. No.: 809,849

[22] Filed: Dec. 18, 1991

Related U.S. Application Data

[63] Continuation of Ser. No. 467,539, Jan. 18, 1990, abandoned.

[51] Int. Cl.$^5$ ............................................... G01F 1/68
[52] U.S. Cl. .............................. 73/204.19; 73/204.25
[58] Field of Search ........... 73/204.15, 204.18, 214.19, 73/214.22, 214.23, 214.25; 338/25, 22 SD

[56] References Cited

U.S. PATENT DOCUMENTS

| | | | |
|---|---|---|---|
| 2,726,546 | 12/1955 | King, Jr. | 73/204.19 X |
| 3,246,515 | 4/1966 | Martino et al. | 73/204 |
| 3,343,114 | 9/1967 | Rice | 73/204.23 X |
| 3,881,181 | 4/1975 | Khajezadeh | 338/25 X |
| 3,931,736 | 1/1976 | Olmstead | 73/204.19 |
| 3,938,384 | 2/1976 | Blair | 73/204 |
| 4,245,176 | 1/1981 | Shooi et al. | 338/22 SD X |
| 4,255,968 | 3/1981 | Harpster | 73/204.18 |
| 4,319,483 | 3/1982 | Durham, Jr. et al. | 73/204.25 X |
| 4,487,213 | 12/1984 | Gates et al. | 137/2 |
| 4,517,838 | 5/1985 | Wachi et al. | 73/204.22 |
| 4,519,246 | 5/1985 | Hartemink | 73/204 |
| 4,548,075 | 10/1985 | Mariano | 73/202 |
| 4,672,997 | 6/1987 | Landis et al. | 137/554 |
| 4,856,330 | 8/1989 | Honda et al. | 73/204.25 |
| 4,982,605 | 1/1991 | Oram | 73/204.19 |

OTHER PUBLICATIONS

Keystone Carbon Company, "PTC Thermistor Engineering Notes", pp. 34–39.
Olin, J. G., "Process GAs Mass Flow Controllers An Overview", Solid State Technology, Apr. 1988, pp. 58–60.
Elmwood Sensors Inc. Pawtucket, R.I., cermaic PTC device flow sensor.

Primary Examiner—Herbert Goldstein
Attorney, Agent, or Firm—Robert G. Crooks

[57] ABSTRACT

Mass flow of a fluid flowing in a conduit is detected by mounting an active device in thermal contact with an external wall of the conduit, the active device being characterized by a positive temperature coefficient of resistance of at least 10%/°C. for a range of temperatures, driving the active device to operate within the temperature range, and detecting mass flow based on the resistance of the active device. In another aspect, a passive temperature sensor is arranged to sense the temperature of the fluid at one position along the conduit, the passive temperature sensor being substantially non-self-heating, an active device is positioned to exchange heat at another position along the conduit, the conduit having a resistance dependent on temperature, and mass flow is detected based on signals from the active device and from the sensor.

2 Claims, 7 Drawing Sheets

FLUID MASS FLOW DETECTING

This is a continuation of application Ser. No. 07/467,539, filed Jan. 18, 1990, now abandoned.

BACKGROUND OF THE INVENTION

This invention relates to detecting mass flow of a fluid in a conduit.

In known techniques for measuring mass flow, temperature sensitive resistance-wire coils are wound at two or more locations along the length of a sensing tube through which the fluid flows. At least one of the coils is heated by an electric current. Some of the resulting heat is exchanged with the fluid flowing in the sensing tube. An upstream coil tends to lose heat to the fluid and thus cools down while a downstream coil gains heat from the fluid and warms up. The resulting temperature differential between the coils is detected as a measure of the mass flow of the fluid.

The coils are typically wound of an iron-nickel alloy having a mildly positive temperature coefficient (PTC); as the temperature of the alloy rises, so does its resistance. Some wire-wound PTC sensors have temperature coefficients in the range of 1–4%/°C. Because the temperature of each coil affects its resistance, the temperature differential may be determined by a bridge circuit in which the coils form two legs. Changes in the temperature of the ambient and changes in the original temperature of the flowing fluid as it enters the sensor affect the differential coil temperature and thus the measurement of fluid flow.

For measuring relatively high mass-flow rates, the fluid flow may be split between a main conduit and a parallel smaller-diameter sensing tube. The coils are wound on the sensing tube instead of the main conduit. The measurement obtained in the split-flow scheme is affected by changes in the ratio of fluid flows in the main conduit and in the sensing tube caused by, e.g., debris in the conduit or tube, or changes in gas viscosity caused by temperature or pressure shifts.

The foregoing techniques are non-invasive in that no part of the sensor equipment is positioned inside the sensor tube. Mass flow may also be measured by invasive sensors which are immersed in the flow gas within the sensing tube. It is known to form such a sensor using positive-temperature-coefficient materials (PTC) such as barium-titanate (a polycrystalline ceramic). It is also known to use a barium titanate PTC thermistor as an air-flow detector based on the shift in dissipation constant that occurs with different ambient conditions.

The resistance-temperature characteristics of a PTC thermistor include a region below a transition temperature (Curie temperature) in which the resistance is relatively constant or declines slowly with temperature rises, and a region above the transition temperature in which the resistance rises sharply with even small temperature increases.

The PTC thermistor may be operated in a constant-temperature mode in which the power supplied to the device is permitted to vary to enable the device always to tend toward the Curie point.

SUMMARY OF THE INVENTION

In general, in one aspect, the invention features detecting mass flow of a fluid flowing in a conduit by mounting an active device externally of the conduit and in thermal communication with an external wall of the conduit, the active device being characterized by a positive temperature coefficient of resistance of at at least 10%/C° at the temperature of interest, operating the active device at that temperature, and detecting mass flow based on changes in the resistance of the active device with temperature assumed to be nearly constant.

In general, in another aspect, the invention features detecting mass flow of a fluid flowing in a conduit, by (a) arranging a passive temperature sensor to sense the temperature of the fluid at a position along the conduit, the passive temperature sensor being substantially non-heating, (b) arranging an active device in a downstream position along the conduit, the active device having a resistance dependent on fluid flow, and (c) detecting mass flow based on change in resistance of the active device and signals from the temperature sensor.

Preferred embodiments of the invention include the following features. The passive temperature sensor is mounted upstream of the active device. The rate of mass flow is measured based on the resistance of the active device and is adjusted based on signals from the passive temperature sensor. An enclosure thermally isolates the active device from the ambient. The active device is driven to maintain a substantially constant temperature. In some embodiments, the conduit includes a sensing line that carries only a portion of a larger mass flow, the larger mass flow being carried in a main flow line. The active device comprises a mass of a thermally sensitive resistance material, e.g., barium titanate or strontium titanate with dopants. The conduit includes a thin walled metal tube supported at opposite ends by welding to a massive metal block. The massive block includes coaxial, spaced-apart ports for coupling to coaxial spaced-apart ends of the conduits.

The detector is accurate and relatively simple to manufacture and install. Fluid flow can be measured on a full-flow basis without requiring split flow. This reduces the impact of viscosity changes caused by pressure and temperature changes, clogging, and attitude sensitivity. The active device can be isolated from the ambient without overheating. The combination of a passive temperature sensor and an active device provides accurate measurements notwithstanding changes in gas temperature. Use of a ceramic device permits higher power and thus achieves more signal gain.

Other advantages and features will become apparent from the following description of the preferred embodiment, and from the claims.

DESCRIPTION OF THE PREFERRED EMBODIMENT

We first briefly describe the drawings.

STRUCTURE

Figure 1:
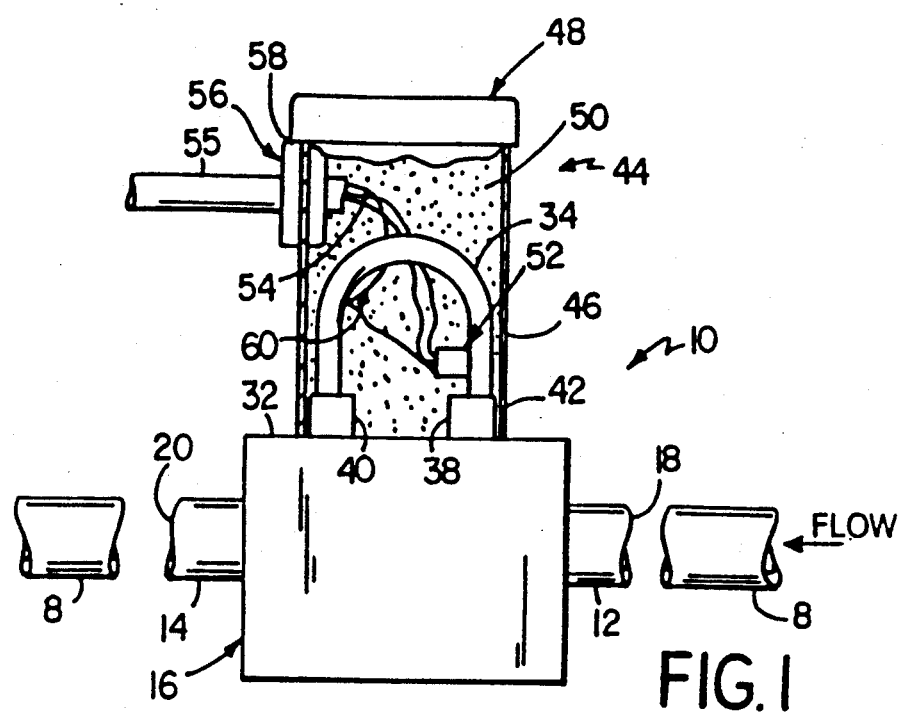
FIG. 1 is a side view, partially in section, of a mass-flow sensor.
Figure 2:
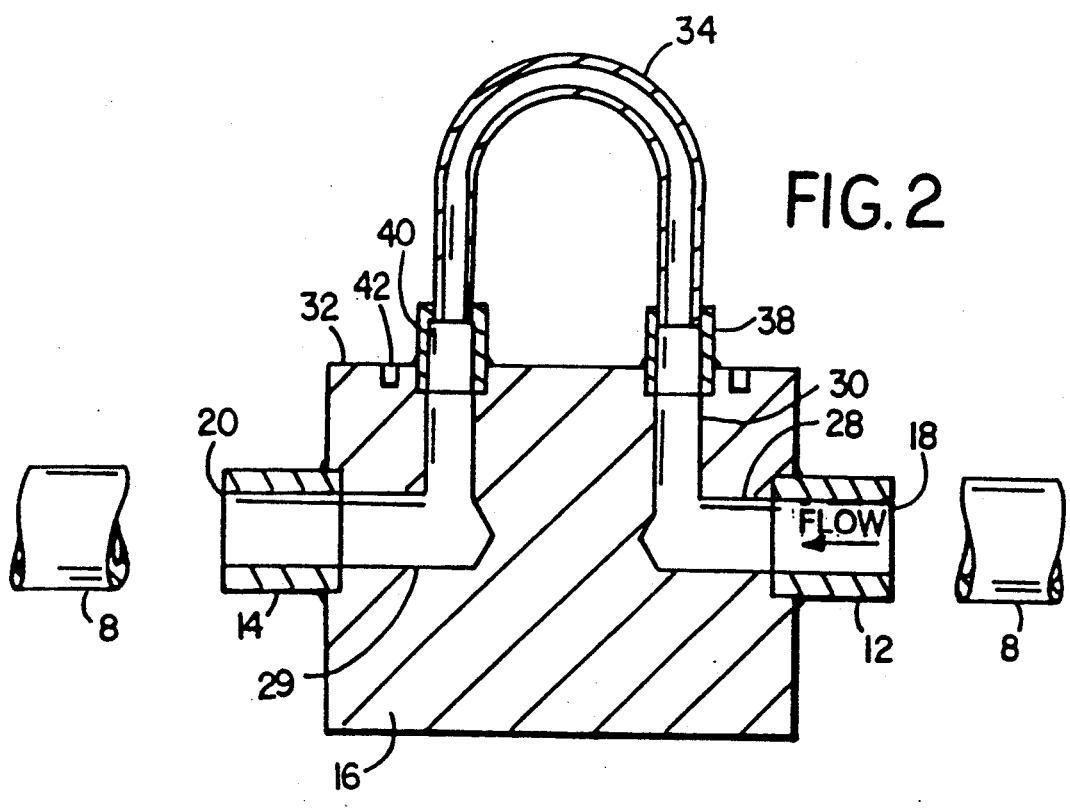
FIG. 2 is a side view, partially in section, of the sensor of FIG. 1 with the cover removed.

Referring to FIGS. 1 and 2, to measure the mass flow of a gas flowing in a main line 8, a mass flow detector 10 is interposed in the line. Detector 10 includes a stainless-steel inlet tube 12 and a stainless-steel outlet tube 14 that are welded to and extend in opposite directions from a stainless steel central block 16 which also supports the other components of the detector. The block and tubes may be of 316L grade stainless steel. Preferably main line 8 is also made of 316L grade stainless steel, and ends 18, 20 of tubes 12, 14 respectively are welded directly to main line 8 using ¼" stainless-steel stubs (not shown). Alternatively, ends 18, 20 of tubes 12, 14 respectively could have ¼" VCR female or male nut-and-gland fittings (available from CAJON as parts SS-4VCR4, SS-4VCR1, SS-VCR3) (not shown) that mate with corresponding male or female fittings on the ends of main line 8.

Inlet tube 12 has an inner bore that opens into one leg of an L-shaped bore in block 16, consisting of a horizontal bore 28 and a vertical bore 30 drilled into manifold block 16. The fluid flows through L-shaped bore 28 and into a U shaped stainless-steel sensing tube 34, which is attached to the top face 32 of the manifold block. The fluid flows from U shaped tube 34 into a second identical L shaped bore 29 in the manifold block, and then returns via exit tube 14 to the main line 8. Detector 10 is a full-flow detector; the entire flow in line 8 passes through U-shaped tube 34, making the detector easier to construct and more accurate than bypass-type flow meters. Furthermore, bores 28 and 29 and U-shaped tube 34 have larger diameters than the tubes used in a typical bypass flowmeter and thus are less likely to be clogged from particulate impurities in the fluid.

Figure 3:
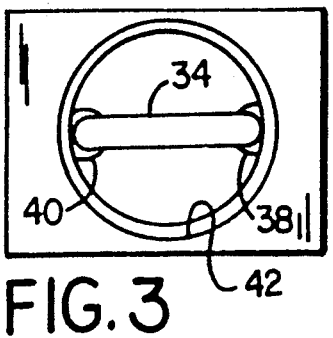
FIG. 3 is a top view of the sensor.

The U-shaped tube 34, and the inlet and outlet tubes 12, 14 are welded to the manifold block to avoid leaks and unnecessary seals. U-shaped tube 34 has a thin wall (0.005") for enhanced heat transfer to and from the fluid and is attached to the manifold block by welded transition tubes 38, 40. Referring also to FIG. 3, a circular indentation 42 is recessed into face 32 of the manifold block and surrounds both ends of the U-shaped tube.

Referring again to FIG. 1, U-shaped sensing tube 34 is completely encased by an aluminum cover 44 having a cylindrical wall 46 and a top 48. The lower edge of wall 46 is press fitted into indentation 42 to provide a tight seal to isolate the interior of the cover from external ambient conditions. The space between tube 34 and the inner surface of the cover is filled with glass wool insulation 50 to prevent changes in external ambient temperature from affecting the accuracy of the flow measurement.

A passive temperature sensor 52 (Type AD590AH, available from Analog Devices, Norwood, Mass.) is thermally bonded (using Thermal epoxy #4951 available from THERMALLOY, INC.) to the outer wall of U-shaped tube 34 near its upstream end. The passive temperature sensor has low self-heating characteristics (i.e., is substantially non-self heating); that is, the sensor exchanges substantially no heat with the gas passing through U-shaped tube 34; rather its purpose is simply to measure the temperature of the gas. The output signal of the temperature sensor is carried to external circuitry (FIG. 7) by wires 54 of a cable 55. A stress relief grommet 56 securely holds the cable in a hole 58 in the cover.

A positive-temperature-coefficient (PTC) thermistor 60 (part no. PL3006-50-100-25-PTO available from Keystone Carbon Co., St. Mary's, Pa.) is thermal epoxy bonded to U-shaped tube 34, downstream of passive temperature sensor 52, in the curve of U-shaped tube 34, and in good thermal contact with the tube for efficient heat transfer between the thermistor and the gas. The PTC thermistor may be a barium-titanate PTC device.

Figure 4:
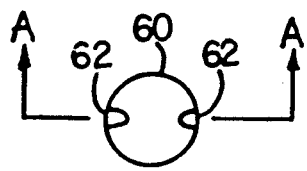
FIG. 4 is a top view of the PTC element of FIG. 1.
Figure 5:
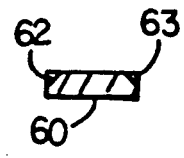
FIG. 5 is a side sectional view of the PTC element of FIG. 4 along line A—A.

Referring to FIGS. 4 and 5, PTC thermistor 60 is a solid disk (mass) (e.g., 1/16" thick and 3/16" in diameter) of barium titanate having a pair of notches 62 to accommodate the curved exterior of U-shaped tube for better thermal contact. Because the disk has a greater bulk than would a thin wire wrapped around the tube, the thermistor can provide higher power dissipation.

Figure 6:
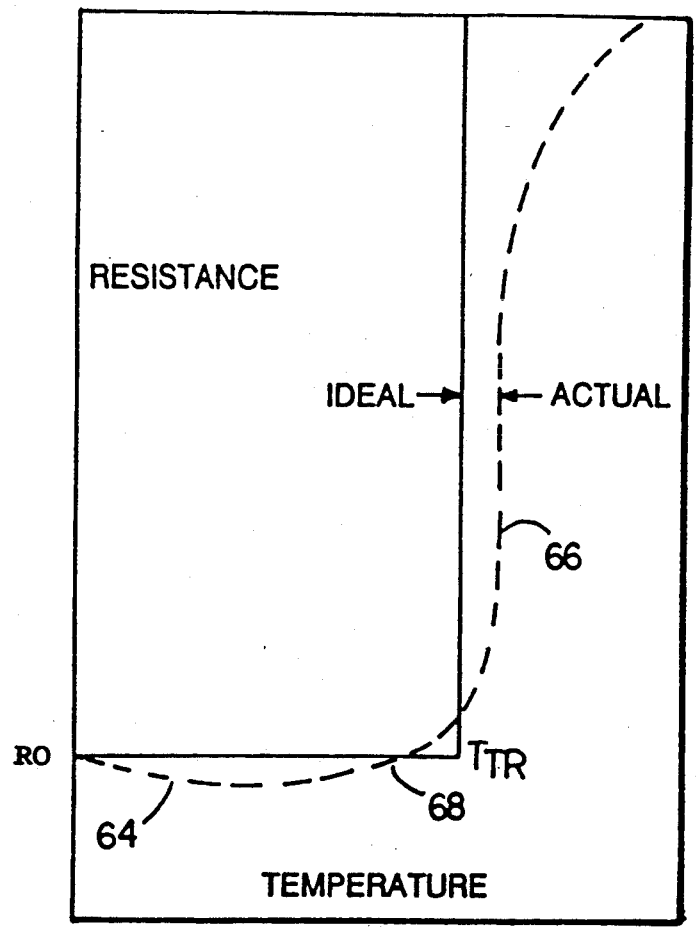
FIG. 6 is a graph of resistance versus temperature for a positive-temperature-coefficient (PTC) material.

Referring to FIG. 6, PTC thermistor 60 has a Curie point $T_{tr}$ and a temperature-resistance profile characterized by a region 64 that is relatively flat (or has a slightly negative temperature coefficient), and a region 66 that has a large positive slope (a highly positive temperature coefficient). The Curie point of the material generally lies near the intersection 68 of the two regions 64 and 66. When the PTC material is at a temperature lower than the Curie point, its resistance is relatively low and, consequently, at a constant voltage, the material draws a large amount of current and undergoes resistive heating. The temperature of the material increases until it reaches the second region 66. In this region the resistance of the material increases greatly, and the current drops as does the amount of resistive heating. This self-limited heating tends to keep the temperature of the PTC material relatively constant, near its Curie point. PTC materials thus will not overheat and can be insulated entirely from the environment as shown in FIG. 1.

The temperature-resistance curve is very steep in the second region 66; in that region a small change in the temperature results in a large resistance change. The percentage change in resistance with temperature is greater than 10%/°C., is typically greater than 25%/°C., and can be as high as 200%/°C. (In one example, the temperature coefficient at 20° C. above the transition temperature (80° C.) is about 17%/°C.) These values are substantially higher than the 1–4%/°C. values of typical wire-wound type PTC devices. The percentage change in resistance depends on the location along the curve of FIG. 6 and the characteristics of the particular commercial device selected. This portion of the temperature-resistance curve can be used for accurate measurement of fluid flow in the detector of FIG. 1. When the gas flows past the thermistor, the temperature of the thermistor drops slightly as it gives up heat to the flowing gas, resulting in a large resistance change. At a constant voltage, the current that the thermistor draws increases significantly. By measuring the change in current, one can measure the change in temperature with great accuracy.

Figure 7A:
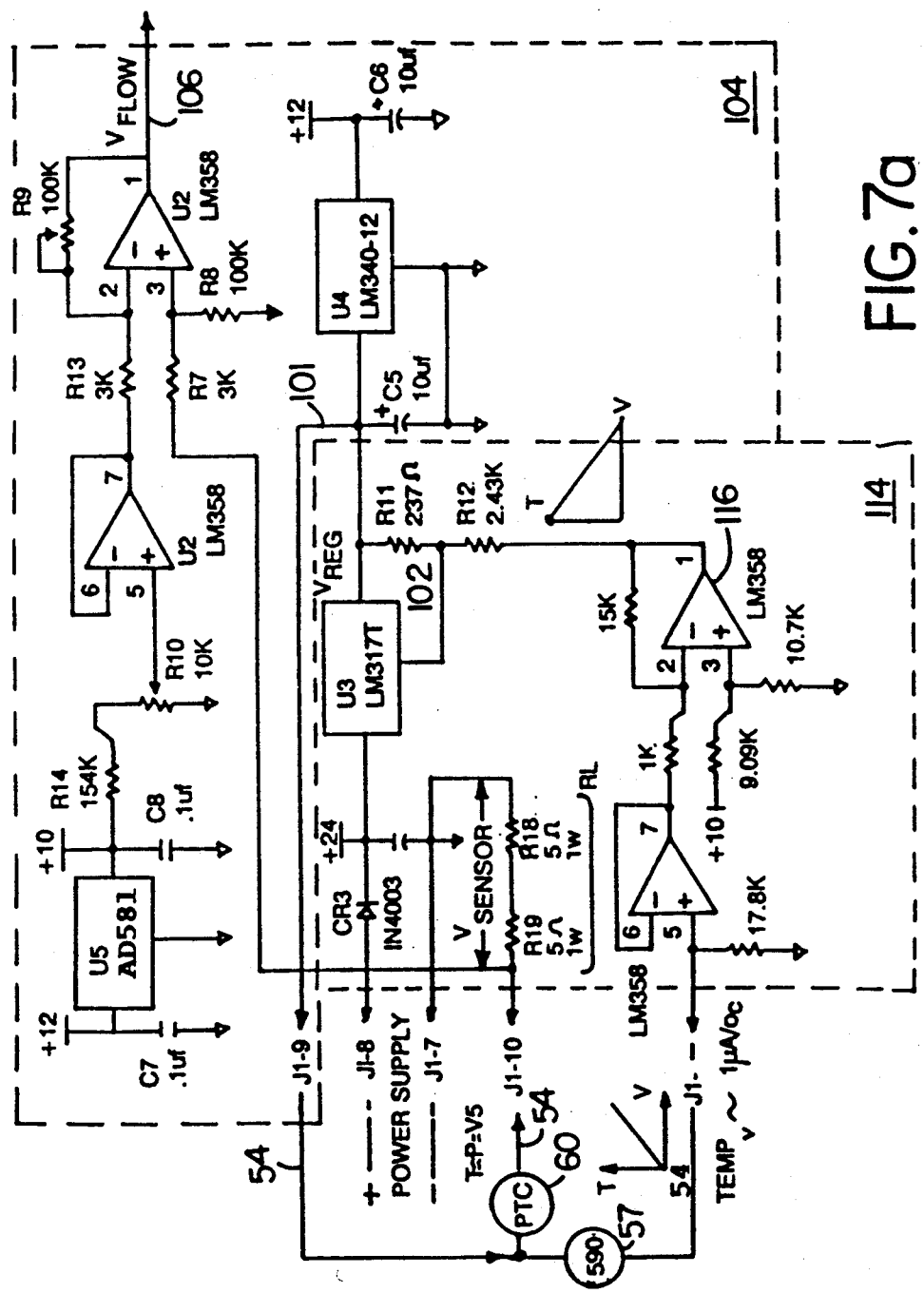
FIGS. 7a and 7b are a circuit diagram.
Figure 7B:
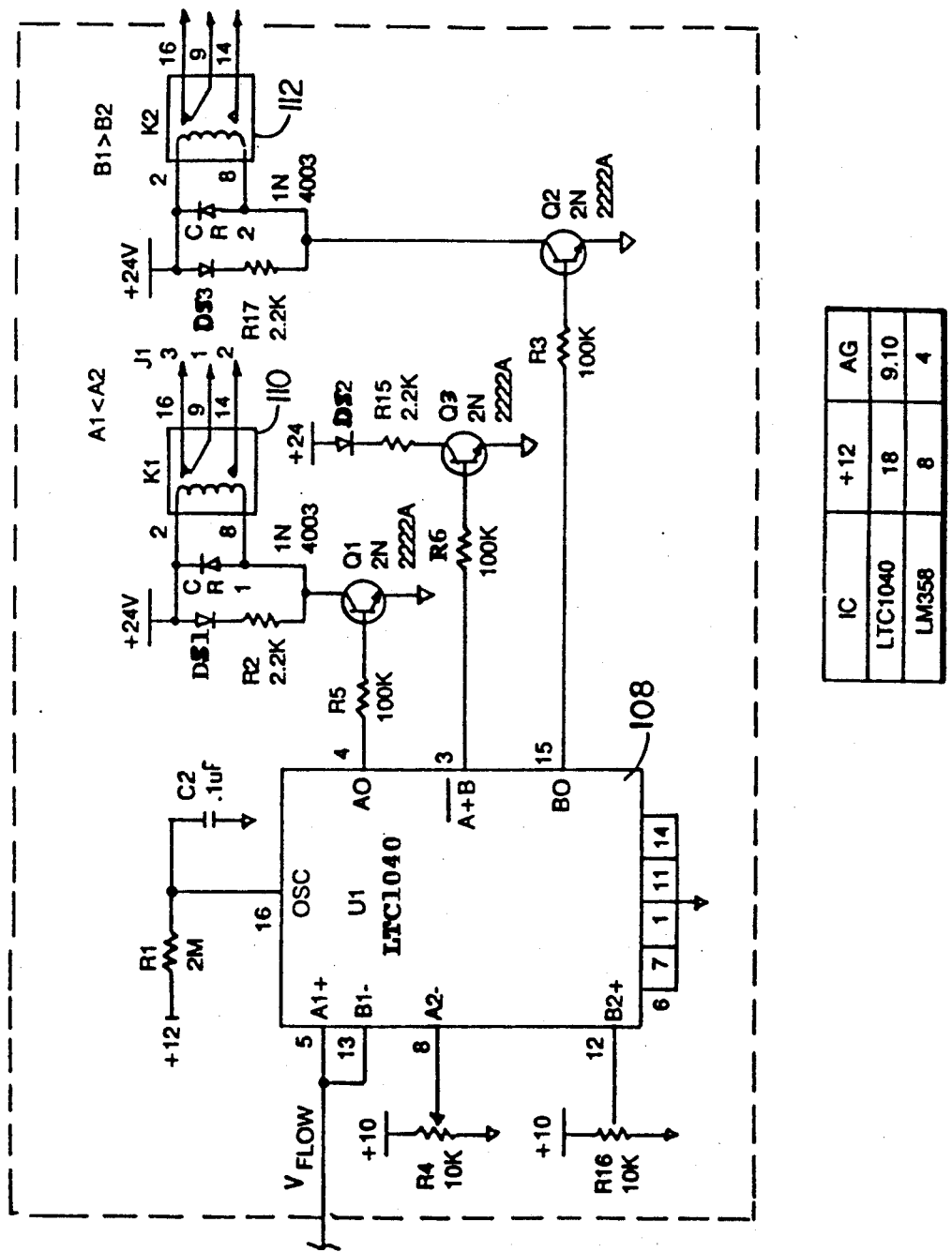

Referring to FIGS. 7a and 7b, the PTC thermistor 60 is supplied from the output 101 of a voltage regulator 102. The current through the thermistor corresponds to the mass flow. The voltage $V_{sensor}$ across resistor $R_L$ thus represents the mass flow rate. The voltage across the resistor is amplified by amplifier 104 to yield an output voltage $V_{flow}$ on line 106. The thermistor operates in the region 66 of FIG. 6 rather than at the transition temperature because of the constant heat loss from the thermistor.

The value on line 106 may be used directly as an indication of relative mass flow of gas in the line, or can be delivered to a comparator circuit 108 whose outputs can be used to drive relays 110, 112, respectively depending on whether the value on line 106 is greater than $A_2$ or $B_2$ as illustrated in FIG. 7.

The output current from passive temperature sensor 52 (which rises with temperature at, e.g., 1 microamp per degree C.) is delivered to a temperature compensation stage 114 indicated in FIG. 7. The current signal is amplified by an empirically determined amount in amplifier 116 and is then applied to voltage regulator 102 to cause its output to vary as a function of the temperature of the gas (as measured by passive temperature sensor 52). Shifting the voltage on PTC thermistor 60 causes its output voltage, and hence the current through $R_L$, to change. This assures that detector 10 will accurately measure mass flow notwithstanding changes in temperature of the gas.

An increase in temperature of the gas at passive temperature sensor 52 reduces the drive voltage to PTC thermistor 60. This reduction of drive voltage begins to cool PTC thermistor 60 slightly, causing its resistance to be lowered. The lowered PTC thermistor resistance causes more current to flow through $R_L$ and thus a higher voltage to be developed across $R_L$.

Figure 8:
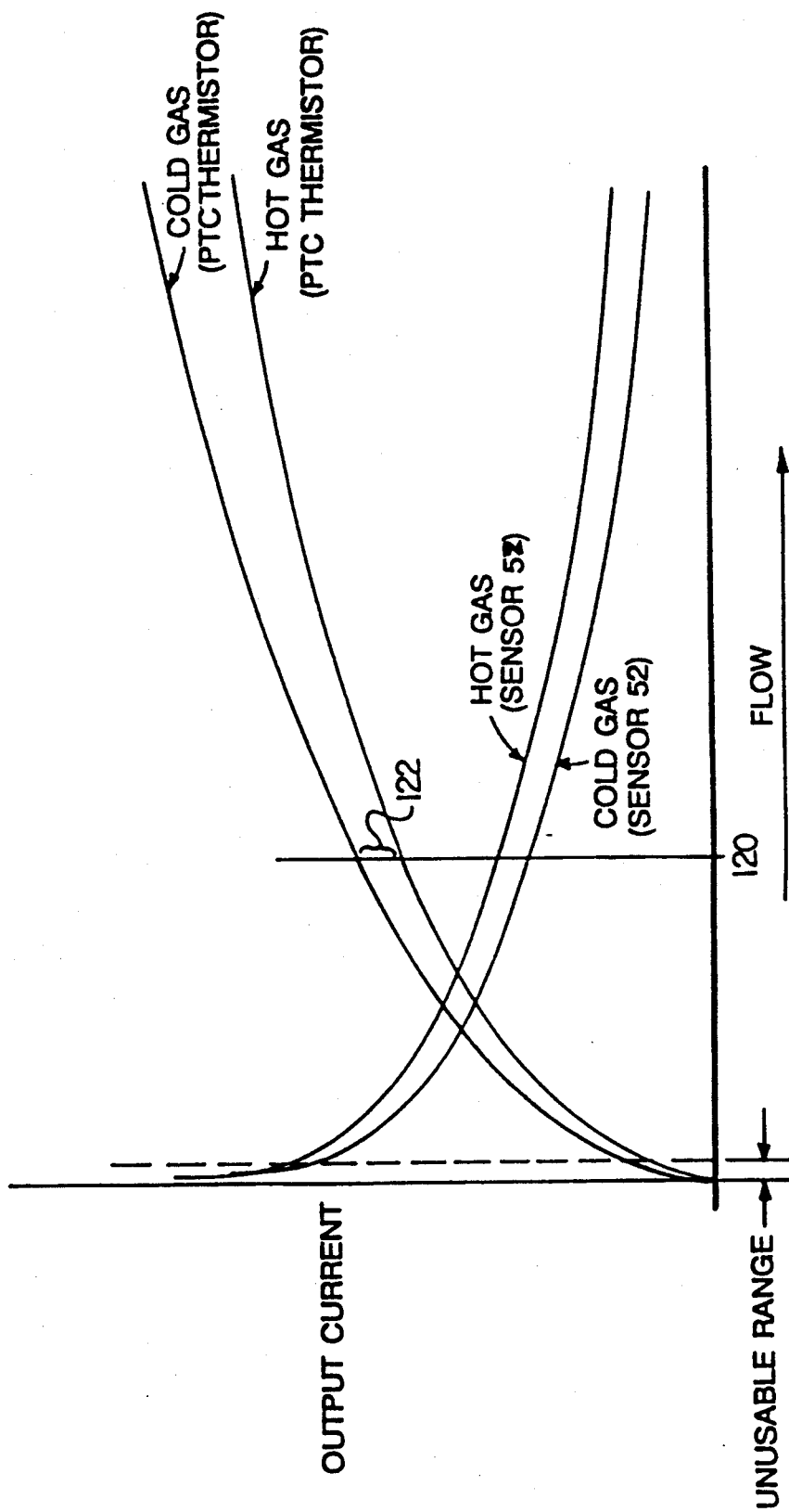
FIG. 8 illustrates the relationship between output current and flow for active and passive sensors at different temperatures.

Referring now to FIG. 8, without use of passive temperature sensor 52 to compensate for temperature changes, the output current generated for a given flow rate 120 is lower for a warm gas than for a cold gas by a differential 122. The output current of passive temperature sensor 52 is higher for a warm gas than for a cold gas, as shown. By adjusting the output current of PTC thermistor 60 by an amount based on the output of passive-temperature sensor 52, the effect of gas-temperature changes on mass-flow readings is reduced. The shift in sensor 52 output and the shift in PTC thermistor 60 output achieved via the voltage regulator are inversely proportional in the region of use.

Figure 9:
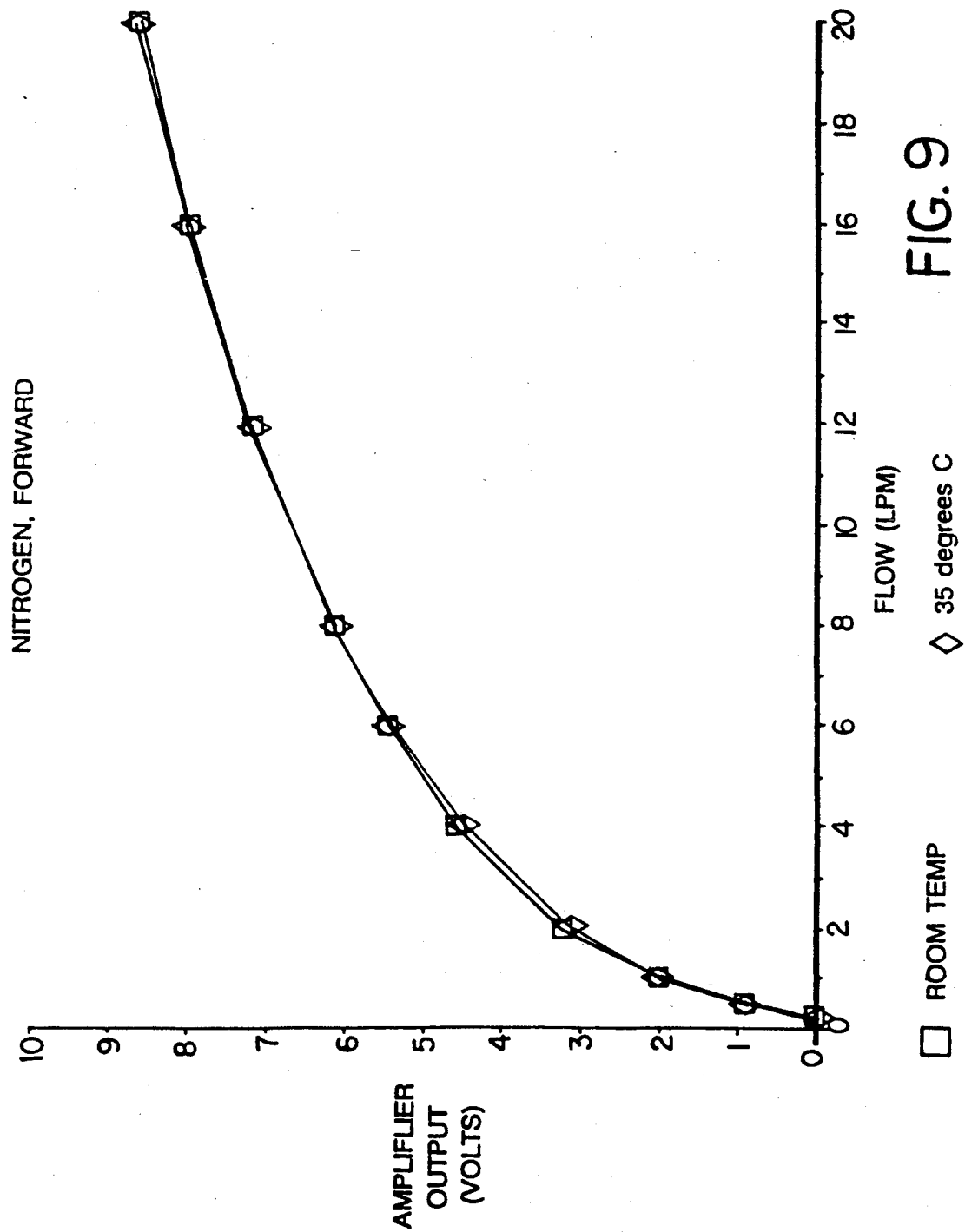
FIGS. 9 and 10 illustrate the relationship of amplifier output to flow of nitrogen and argon at indicated temperatures.

Referring to FIG. 9, with the use of passive temperature sensor 52, for nitrogen at two temperatures (room temperature and 35 degrees C.) and with flow rates through a ¼" line ranging from 0 to 20 liters per minute, the amplifier output $V_{flow}$ on line 106 is affected very little by the shift in temperature. At a flow of 7 liters per minute, for example, the effect was found to be less than 1/10 of 1% per degree C.

Figure 10:
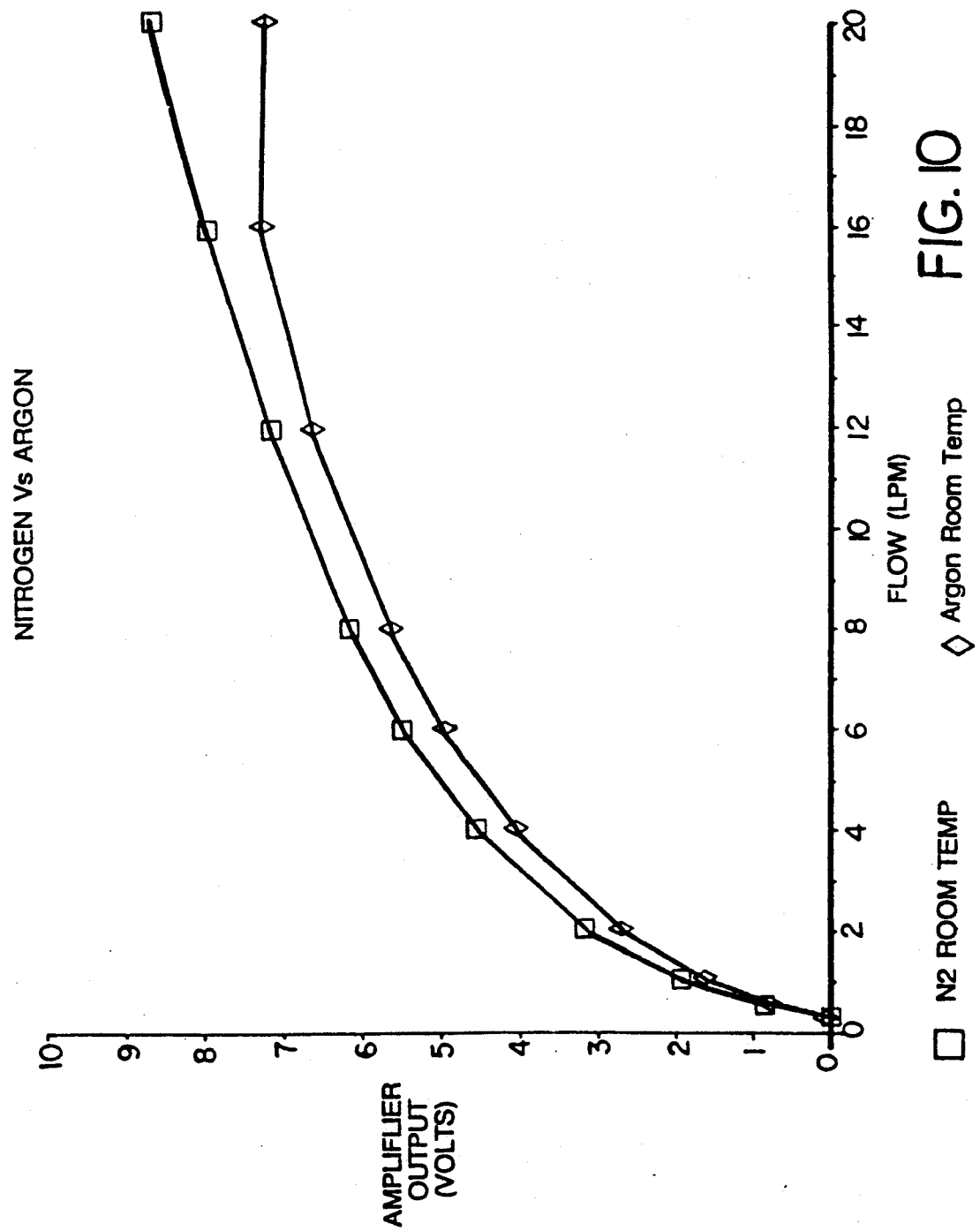

FIG. 10 illustrates the variation in output for two different gases (nitrogen and argon) both at room temperature.

Other embodiments are within the appended claims. For instance, other PTC materials e.g., strontium titanate, may be used in place of barium titanate.

In some embodiments, the gas-flow detection could take place on a split line rather than in the main line. In FIG. 1, line 8 would be a split line in parallel with a separate main line (not shown).

Instead of measuring only changes in mass flow as in the circuit of FIG. 7, mass flow could be measured by means of a different circuit which would be microprocessor-based and would rely on families of curves derived during a calibration operation. For calibration, the detector would be placed on a flow pipe in series with a standard volumetric flow meter of known accuracy and a gas would be passed in succession through detector 10 and then the meter. Because the heat absorbed by the gas would depend on many variables, the composition of the gas would have to be known, as well as its physical properties, such as density and temperature. The volumetric flow rate (as determined by the volumetric flow meter) would be converted to a mass flow rate, and the current drawn by PTC thermistor 60 would be measured to give a data point on a calibration curve for the temperature of the gas. The flow rate would be changed (keeping the gas temperature a constant) and a new current would be measured to give another point on the calibration curve. In this way an entire calibration curve would be generated which would relate the flow rate of a given gas to the current drawn by PTC thermistor 60, at a given temperature. In a further set of calibration steps, the temperature of the gas would be varied to obtain a new calibration curve, one for each temperature.

The calibration procedure would be repeated for each different gas that the detector is designed to measure.

What is claimed is:

1. Apparatus for detecting flow of fluid in a conduit, said apparatus comprising:
   (a) a thermally-conductive sensing tube adapted to be inserted into or coupled to said conduit to receive fluid flow therefrom;
   (b) a thermistor mounted on said sensing tube in close thermal contact therewith to transfer heat through the wall of said sensing tube to any fluid within said sensing tube passing the mounting point of said thermistor thereon, said thermistor being characterized at an operating point by a large positive temperature coefficient of resistance of at least ten percent per Centigrade degree;
   (c) a supply circuit for said thermistor, said supply circuit including a voltage regulator responsive to a control signal, and a load resistor connected in series with said thermistor across the output of said voltage regulator for developing an electrical signal proportional to the rate of transfer of said heat from said thermistor to said fluid whereby an incremental change in temperature of said thermistor resulting from a change in flow of fluid causes a corresponding change in resistance of said thermistor and in the electrical current throught it and said load resistor, concurrently returning said thermistor to said operating point;
   (d) a passive sensor mounted on said sensing tube in close thermal contact therewith, upstream from said thermistor, for developing a temperature signal that is a function of the temperature of any fluid within said sensing tube passing the mounting point of said passive sensor thereon, without exchanging significant heat with said fluid; and
   (e) means for amplifying said temperature signal to generate a control signal and for feeding said control signal to said voltage regulator, to produce an output opposing the voltage effect across said load resistor of any change in temperature of said fluid on said thermistor.

2. Apparatus in accordance with claim 1, further including means for reading out said voltage across said load resistor as a measure of said flow of fluid in a conduit.

* * * * *